United States Patent Office 3,609,949
Patented Oct. 5, 1971

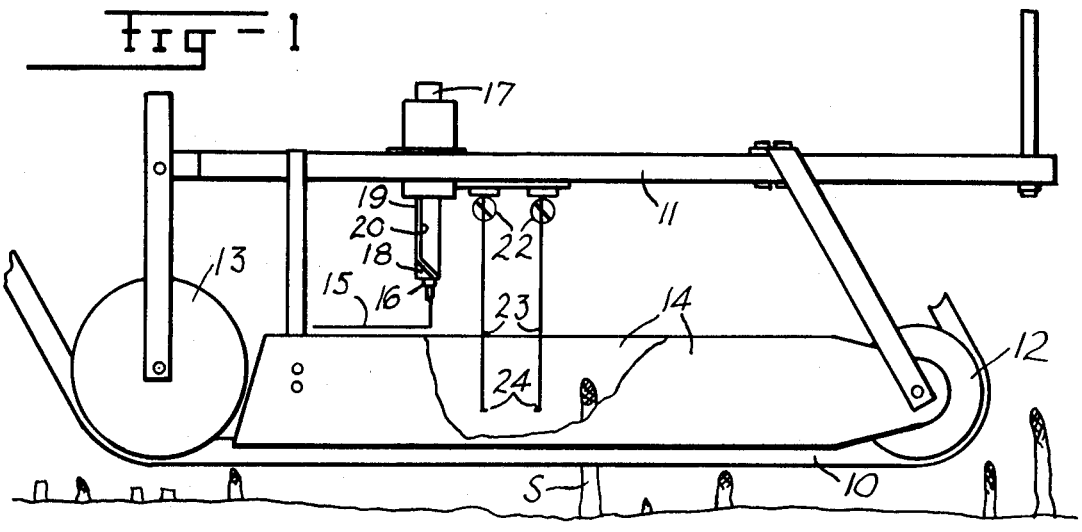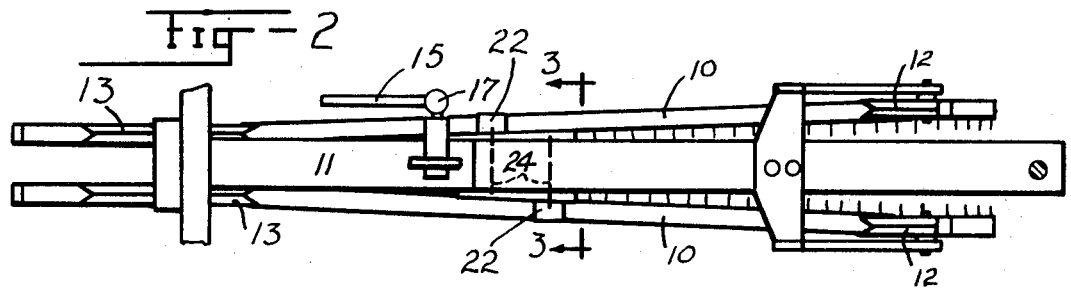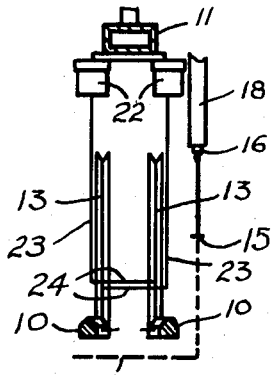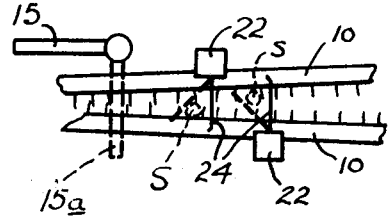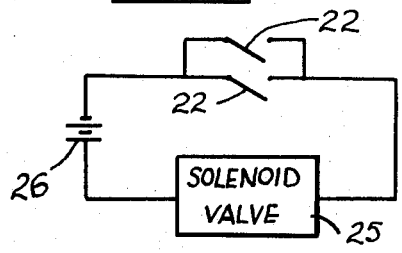

3,609,949
CONTROL APPARATUS FOR ASPARAGUS HARVESTER
Archie E. Neal, Garfield, Wash., assignor to
J. E. Love Company, Garfield, Wash.
Filed Apr. 9, 1970, Ser. No. 26,908.
Int. Cl. A01d 45/00
U.S. Cl. 56—327 A                 4 Claims

ABSTRACT OF THE DISCLOSURE

This disclosure relates to a selective asparagus harvester having a cutting knife that is moved between an inoperative position clear of the field crop and an operative position for cutting selected spears within a converging machine channel. The improved control arrangement comprises a pair of switches located immediately forward of the knife mechanism and protruding oppositely across the channel. The switches are operatively connected in parallel to make the total time of switch operation substantially constant, regardless of the transverse position of a particular spear across the width of the channel.

BACKGROUND OF THE INVENTION

The development of machine harvesting equipment for asparagus has proven to be a relatively difficult challenge due to the peculiar nature of this crop. Asparagus spears grow in a somewhat random fashion along a field and do not mature in a controlled cycle. A harvester must select spears of mature size and leave younger spheres for subsequent harvesting. Because of spears grow relatively close to one another in no particular pattern, the timing of spear detection and cutting must be as precise as possible for maximum efficiency in harvesting.

An example of a prior art device for selectively cutting asparagus spears by use of a movable knife is shown in U.S. Pat. No. 3,410,067 to Fuchs. In the disclosed embodiment, a time delay switch is located forward of the knife mechanism. The time delay switch operates the knife mechanism for a fixed period upon actuation. However, the time of contact of a sphere with the switch sensor will vary with the transverse location of the spear. Spears close to the switch pivot will contact it for a shorter duration than those adjacent its outer end. In addition, the time delay duration is normally fixed and does not vary with machine ground speed. Either the machine must be run at a constant rate of speed, or the knife must be left in a cutting position for a longer period than necessary as ground speed increases.

To provide greater effectiveness in cutting selection, the present apparatus relates to an improvement in the switch mechanism. A pair of switches are used in tandem in such fashion that the total duration of spear contact with the two switch sensors will be constant at any constant ground speed for the machine. Furthermore, the duration of spear contact will be proportional to the rate of speed, so that the knife sequence will decrease in time with an increase in machine ground speed.

SUMMARY OF THE INVENTION

This invention relates to an improvement in the control apparatus for a selective asparagus harvester having a mechanically movable knife. The invention resides in the use of a pair of switch sensors mounted at opposite sides of the channel through which asparagus is directed. The switches are located forwardly adjacent to the operative knife position and have transverse sensing portions which are identical, but are directed oppositely across the channel. One sensing device is forward of the other so that the two are contacted in a progressive sequence. The two switches are wired in parallel in the knife control circuit. Operation of the first switch initiates movement of the knife from an inoperative position to a cutting position, which is then maintained until the spear has passed the sensing portion of the second switch. At that moment, the knife mechanism returns to its inoperative position.

An object of this invention is to provide a sensing arrangement for asparagus harvesters which results in a duplication of switch contact duration by spears independent of spear position.

Another object of the invention is to provide a delayed switch operation for an asparagus harvester using conventional switches in place of more expensive time delay switches and devices.

Another object of the invention is to provide a control arrangement for asparagus harvesters wherein the duration of the control sequence varies inversely to machine ground speed.

These and further objects will be evident from the following disclosure, taken together with the accompanying illustrative drawings. The drawings show the main components of the apparatus in relation to this invention, and are not intended to restrict the scope of the invention to any specific structural shape.

BRIEF DESCRIPTION OF THE DRAWINGS

FIG. 1 is a fragmentary side elevation view of a single harvesting channel for an asparagus harvester;
FIG. 2 is a top view of the channel shown in FIG. 1;
FIG. 3 is an enlarged sectional view taken along line 3—3 in FIG. 2;
FIG. 4 is a schematic diagram illustrating the operation of the improvement; and
FIG. 5 is a simplified wiring diagram.

DESCRIPTION OF THE PREFERRED EMBODIMENT

The present apparatus relates to a selective asparagus havester. The components of the harvester to which this is directed relate to spear detection and cutting. The equipment is mounted adjacent to the ground and is normally found at the forward end of the harvesting equipment. In a harvester of this type, there normally are a number of longitudinal channels into which the mature spears pass during travel of machine along the ground surface. FIGS. 1, 2 and 3 illustrate a single channel structure, it being understood that a plurality of such channels are mounted side-by-side across the machine, either in aligned or staggered configurations.

Referring to FIGS. 1, 2 and 3, each channel is bounded by a pair of pickup belts 10 having inwardly directed fingers or crop engaging surfaces. The belts 10 converge rearwardly to grip the mature spears and to elevate the spears after each has been cut. Belts 10 are supported by a longitudinal bar 11 rigidly connected to the supporting mobile machinery. The positions of the belt flights along the lower part of the apparatus are defined by forward pulleys 12 and rear pulleys 13 suitably supported from the framework 11 by brackets. A pair of belt guides 14 extend along the outside edges of the lower flights of belt 10 to define the shape of the converging channel.

As shown, a horizontal knife 15 is used to selectively cut mature spears of asparagus. The knife 15 is fixed to a vertical stem 16 moved vertically by double acting hydraulic cylinder assembly 17. The stem 16 slides vertically within a tubular guide 18. Guide 18 is slotted at 20 to receive a projecting pin 19 on stem 16. The slot 20 is in the form of a helix, whereby knife 15 is rotated ninety degrees about the axis of stem 16 during travel of the stem 16 under the control cylinder assembly 17. The right angle pivotal movement occurs adjacent the lower end of travel of stem 16 relative to the ground.

The improved control apparatus for timing the operation of knife 15 and controlling its sequence of movement between the raised non-operative position and its lowered operative or cutting position comprises a pair of switches 22 fixed relative to longitudinal bar 11 on the mobile framework. Switches 22 are positioned forwardly adjacent to the knife apparatus. As shown, they are mounted at opposite sides of the longitudinal bar 11. Each switch assembly is identical, including a conventional normally open electrical switch that is closed by pivotal movement of an operating element about a vertical axis. The switch operating element is moved by a wire 23 that extends downwardly from the respective switch 22 to an elevation corresponding to the minimum height of mature asparagus spears which are to be harvested. At their lower ends, the wires 23 terminate in horizontal portions 24 which project oppositely across the channel defined by the lower flights of the pickup belts 10. The portions 24 are slightly different in elevation so as to eliminate the possibility of one becoming entangled in the other.

As seen in FIG. 4, the identical wire portions 24 are spaced longitudinally with respect to one another and with respect to the operative position of knife 15, which is indicated in dashed lines at 15a. The spacing of switches 22 and knife position 15a is such that the two switches 22 will be operated in a continuous sequence to control the knife operation. When connected in a parallel circuit with a suitable solenoid valve 25 and source of electrical energy, such as battery 26 (FIG. 5), the operation of switches 22 overlap one another in a progressive time sequence to hold knife 15 at position 15a for a period of time during which a spear passing switches 22 will be severed adjacent to the ground. The switches 22 must be spaced along the bar 11 so as to take into account the operating lag that exists in the actual components of the control circuitry.

The advantage of this switch arrangement can be seen in FIG. 4. The total time of spear contact with the two sensing portions 24 for the two switches 22 is independent of the transverse position of a spear, indicated in FIG. 4 by the letter S. For instance, a spear that is located toward the top of the channel as shown in FIG. 4 will remain in contact with the sensor portion 24 of the forward switch 22 a greater length of time than would a spear toward the bottom of that figure. However, the upper spear will in turn release the sensor portion 24 of the second or rearward switch 22 after a shorter period of contact than is the case with the lower spear. Therefore, the total time of contact will average to a constant value. Furthermore, the period of time will vary automatically with ground speed. Faster ground speed will result in a shorter total duration of contact of a spear with the two switch assemblies, thereby reducing the period of time at which knife 15 is held at the position 15a. This arrangement makes use of common momentarily open or closed switches, replacing the conventional and more expensive time delay devices.

Various modifications might be made in this specific structure without changing the essential concept of the two opposed switches spaced longitudinally forward of the cutting knife apparatus. For this reason only the following claims are intended to serve as definitions of the disclosed invention.

Having thus described my invention, I claim:

1. In an asparagus harvesting machine of the type comprising:
   a mobile framework;
   spear guide means on said framework adjacent to the ground for directing asparagus spears along a longitudinal channel during movement of the framework;
   cutting means on said framework movable between a first position projecting across the channel and a second position clear of the channel;
   and control means operatively connected to said cutting means for selectively moving said cutting means to said first position upon detection of a spear within said channel;
   the improvement in said control means, comprising:
      dual spear sensor means movably mounted at opposite sides of the channel in the path of spears selected for harvest, said sensor means being projected horizontally and being spaced longitudinally within the channel forward of the first position of said cutting means for engaging a spear of minimum height in a progressive time sequence, whereby the total duration of contact of a spear by said sensors is independent of the spear location within the channel.

2. The apparatus as set out in claim 1 wherein said dual spear sensor means comprises:
   a pair of switch elements mounted at opposite sides of the channel at a location forwardly adjacent to the first position of said cutting means, said switch elements each having identical detection wires protruding across the channel at the approximate minimum spear height, one of said wires being forward of the other;
   said switch elements being wired in parallel and being operatively connected to said spear cutting means so as to initiate movement of said cutting means from its second position to its first position upon contact of a spear by the forward detection wire, and to maintain the cutting means in said first position until it has passed the spear location.

3. The apparatus as set out in claim 1 wherein said dual spear sensor means comprises:
   a first sensor pivotally mounted to the framework about a vertical axis on one side of the channel and located in a horizontal plane corresponding to the minimum height of spears;
   means yieldably biasing the sensor to a position extending transversely across the channel and permitting pivotal movement thereof in response to spear contact;
   a second sensor pivotally mounted to the framework about a vertical axis at the remaining side of the channel and located in a plane parallel to and vertically adjacent to said horizontal plane;
   the second sensor being located on said framework rearward of said first sensor;
   both sensors being of the same effective lengths within said planes.

4. In an asparagus harvesting machine of the type comprising:
   a mobile framework;
   a pair of endless gripping belts movably supported by said framework including rearwardly converging flights between which asparagus spears are received during movement of the framework along a field;
   movable cutting means on said framework for selectively severing individual spears located between the gripping belts;
   and a control apparatus operatively connected to said cutting means for selectively moving said cutting means between operative and inoperative positions;
   The improvement, comprising:
      first spear sensing means mounted to one side of the gripping belts forward of said cutting means and protruding across the space separating the belts for detecting the presence of a spear between the belts having a pre-selected height, said sensing means being movable in a horizontal plane in response to contact by the spear;
   and second spear sensing means mounted to the opposite side of the gripping belts immediately rearward of said first sensing means and forwardly of said cutting means, said second spear sensing means protruding across the space separating the belts in a direction opposite to said first spear sensing means for contact by a spear prior to and following release of the first spear sensing means by the spear, said second spear sensing means being movable in the horizontal plane common to said first spear sensing means; said first and second sensing means being operatively connected in parallel within the control apparatus for said movable cutting means so as to average the total time of contact by a spear independent of the spear location across the space separating the gripping belts.

References Cited

UNITED STATES PATENTS

| | | | |
|---|---|---|---|
| 2,690,043 | 9/1954 | Marihart | 56—327 A |
| 2,767,544 | 10/1956 | Turkington | 56—327 A |
| 3,176,456 | 4/1965 | Franzen | 56—327 A |
| 3,410,067 | 11/1968 | Fuchs | 56—327 A |
| 3,447,292 | 6/1969 | Rehmke | 56—327 A |

RUSSELL R. KINSEY, Primary Examiner